June 30, 1931.  A. O. BROOKE  1,812,468
LOCK WASHER UNTANGLING DEVICE
Filed April 28, 1928
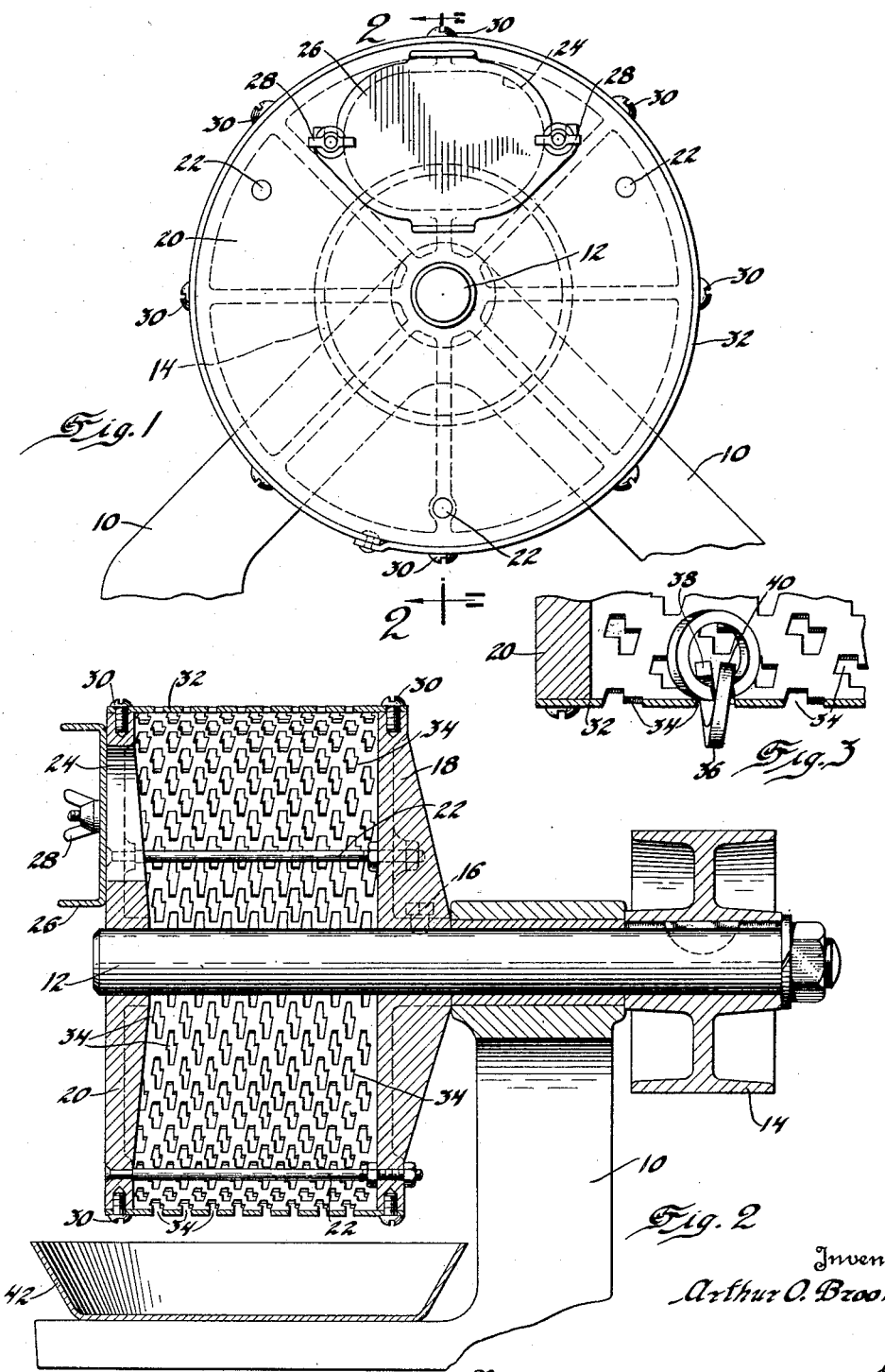
Inventor
Arthur O. Brooke
By Blackmore, Spencer & Fuchs
Attorney Patented June 30, 1931

1,812,468

UNITED STATES PATENT OFFICE

ARTHUR O. BROOKE, OF DETROIT, MICHIGAN, ASSIGNOR TO GENERAL MOTORS CORPORATION, OF DETROIT, MICHIGAN, A CORPORATION OF DELAWARE

LOCK WASHER UNTANGLING DEVICE

Application filed April 28, 1928. Serial No. 273,758.

My invention relates to a device for untangling lock washers of the well known type in which a square strip of metal is curled into circular form, the adjacent ends being bent away from each other so that when the washer is placed under a nut, it will be compressed by tightening the nut, and will serve to prevent the latter from working loose. It is well known that when a quantity of such washers are placed together, there is a tendency for them to become linked to each other, due to the fact that there is a gap between the adjacent ends of each washer. Whenever the gaps of two washers register in a certain manner, it is possible for the washers to become interlinked.

In present day quantity production assembly methods, time is a very important element. A workman who reaches for a lock washer while assembling the parts, cannot afford to spend his time unhooking it from others. If the one he picks up is linked with others, he throws the whole string to one side and they must eventually be untangled by hand.

An object of my invention is to provide a power driven machine which will automatically untangle such lock washers from each other. This machine consists of a rotatable drum in which is formed a plurality of slots so shaped that the lock washers will tend to fall into the slots in such a position as will serve to unhook them from other washers. Only one washer may pass through an opening at a time. The untangled washers fall into a tray and when furnished to the workmen, each one is separated from the others so that he may pick up one at a time.

Other objects and advantages will be apparent upon referring to the specification and accompanying drawings, in which:

Figure 1 is a side view of my lock washer untangling device.

Figure 2 is a section on the line 2—2 of Figure 1.

Figure 3 is a section, on a larger scale, of a portion of the drum, showing one lock washer being unhooked from another.

The reference numeral 10 indicates a base in which is journalled a shaft 12 having keyed to it a pulley 14, which is driven from any suitable source of power. Secured to the shaft by a set screw 16, is an end member 18. A second end member 20 is also supported on the shaft, and is connected to the end member 18 by long bolts 22. An opening 24 is provided in the end member 20 and a cover 26, held in place by wing nuts 28, serves to close this opening. Secured to the end members 18 and 20 by a plurality of screws 30, is a drum 32. This drum has formed in it a plurality of slots 34, which correspond in shape to the edge view of a lock washer 36 of the type shown in Figure 3. This lock washer is formed from a strip of flat stock, which is curled up into circular form, the ends 38 and 40 being bent away from each other so that the washer may be compressed when placed under a nut which is drawn up tight.

Such washers are used in large quantities in connection with machinery and motor vehicles, and it is a well recognized fact that they have the undesirable characteristic of becoming tangled together. Whenever two of such washers come into contact with each other with the openings between their respective ends in a certain relation, they may become hooked together, and can only be unhooked by placing them in exactly the same relation. This requires time and when a workman is engaged in assembling parts on a rapidly moving conveyor system, he cannot afford to take the necessary time to unhook these washers from each other. The result is that when he picks up a washer and finds one or more other washers connected to it, he throws the whole string on the floor, and it must afterward be picked up and untangled by other workers.

In order to automatically untangle such washers from each other, I insert a quantity of them through the opening 24 into the drum 32. The cover 26 is then secured in place and the drum is rotated. The slots 34 are so shaped that those washers which are at the bottom of the drum will tend to fall edgewise into them, with the open end portion of the washers toward the top. It will be seen that it is impossible for a washer to fall into the slot in any other position, due to the fact that the shape of the slot and the shape of the washer only coincide in this particular position. As the drum is being continually rotated, the other washers which are linked with the ones in the slots, are moved about and when they come to the correct position, will disengage themselves from the washers in the slot. It is possible that a washer may have to fall into and out of a slot several times before it is unhooked from the washer immediately above it, but this is not objectionable since the drum is continually rotating. It will be obvious that due to the shape of the slots, only one washer may pass through a slot at a time. Some of the washers may be unhooked from each other merely by the tumbling action of the drum, and when they fall into the slots, will drop right through.

I have found that a large quantity of badly tangled washers may be placed in my device and after rotating the drum for some time, they will all become untangled from each other and will fall out through the slots one at a time. As the washers drop out of the drum 32, they fall into a tray 42, which when filled is furnished to the workmen. The washers at this time are each separated from the others, and there is no possibility of them becoming tangled together again since they are not moved about with respect to each other.

It is thought from the foregoing taken in connection with the accompanying drawings that the construction and operation of the device will be apparent to those skilled in the art, and that various changes, size, shape, and proportion and details of construction may be made without departing from the spirit and scope of the appended claims.

I claim:

1. A device of the class described comprising a movable member having a plurality of slots formed therein, each of said slots having one side cut away angularly from one end to a point slightly past the transverse center line of said slot, and having the other side cut away angularly from the opposite end to a point slightly past the transverse center line of the slot, whereby the slots are of greater width at their center than at their ends, for the purposes set forth.

2. A device of the class described comprising a movable member having a plurality of slots formed therein, each of said slots having a triangularly shaped portion cut away from one side, the apex of said triangularly shaped portion being located at the end of the slot and the base being located slightly past the transverse center line of the slot, and a correspondingly shaped portion being cut away from the opposite end of the other side, for the purposes set forth.

In testimony whereof I affix my signature.

ARTHUR O. BROOKE.